United States Patent [19]
Coulter

[11] Patent Number: 5,312,177
[45] Date of Patent: May 17, 1994

[54] OVERSIZE FILING SYSTEM

[75] Inventor: J. Scott Coulter, Elko, Nev.

[73] Assignee: Xcel Industrial Group, Inc., Elko, Nev.

[21] Appl. No.: 875,240

[22] Filed: Apr. 28, 1992

[51] Int. Cl.⁵ .............................................. A47B 63/00
[52] U.S. Cl. ...................................... 312/184; 211/46; 211/184; 211/189; 403/353; 403/381
[58] Field of Search ...................... 312/184, 193, 348.5; 211/45, 46, 184, 189; 403/353, 381

[56] References Cited

U.S. PATENT DOCUMENTS

| | | | |
|---|---|---|---|
| 2,325,317 | 7/1943 | Hanna | 312/184 X |
| 2,855,258 | 10/1958 | Moncier | 211/184 X |
| 3,540,786 | 11/1970 | Potter | 312/184 |
| 3,860,119 | 1/1975 | Irvine et al. | 211/45 |
| 3,954,184 | 5/1976 | Mendenhall | 211/184 |
| 4,512,480 | 4/1985 | Evenson | 211/184 X |
| 4,616,892 | 10/1986 | Schleicher | 211/184 X |
| 4,643,306 | 2/1987 | Ryan | 312/184 |
| 4,756,581 | 7/1988 | Phillips | 312/183 |
| 4,889,397 | 12/1989 | Ryan | 312/193 X |
| 5,088,801 | 2/1992 | Rorke et al. | 312/184 |

FOREIGN PATENT DOCUMENTS

| | | | |
|---|---|---|---|
| 1200229 | 12/1959 | France | 312/184 |
| 2407082 | 6/1979 | France | 211/184 |

Primary Examiner—Lloyd A. Gall
Attorney, Agent, or Firm—Handal & Morofsky

[57] ABSTRACT

A filing system adaptor, to be inserted into an existing file cabinet drawer having a conventional hanging file frame with a pair of parallel side rails for supporting hanging files, is disclosed. A removable base plate made of plastic is placed at the bottom of the file cabinet drawer. A number of oversized dividers made of rigid plastic are used to keep documents organized. With a height of about eleven inches, the dividers store large, bulky documents within the same filing cabinet drawer as standard letter size and legal size documents, and the dividers fit within the closed cabinet drawer by resting at an angle of about 60 degrees. A deep cutaway in the divider allows the user to quickly identify the documents maintained in the filing system. The oversized dividers are secured into place by locking tabs at the bottom edge of the divider which lock into accommodating slots in the base plate. Tabs at the top edge of the oversize divider provide support through resting on the parallel rails of the existing file frame. The base plate is adjustable to any length cabinet drawer through perforations in the base plate located at various positions along the length of the base plate. The perforations are adapted to allow a portion or portions of the base plate to be removed to adjust the size of the base plate to fit a particular file cabinet drawer.

13 Claims, 7 Drawing Sheets

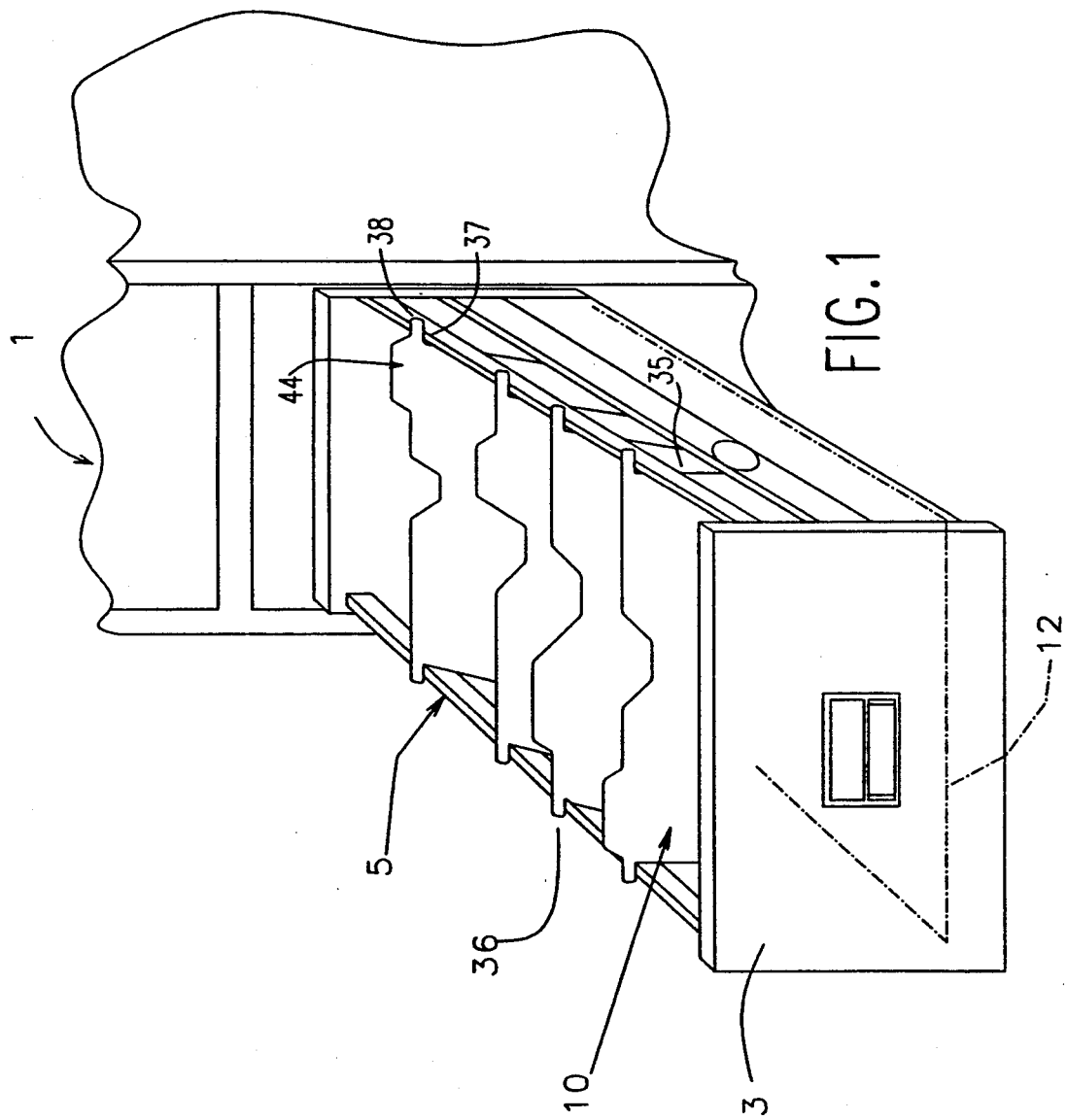

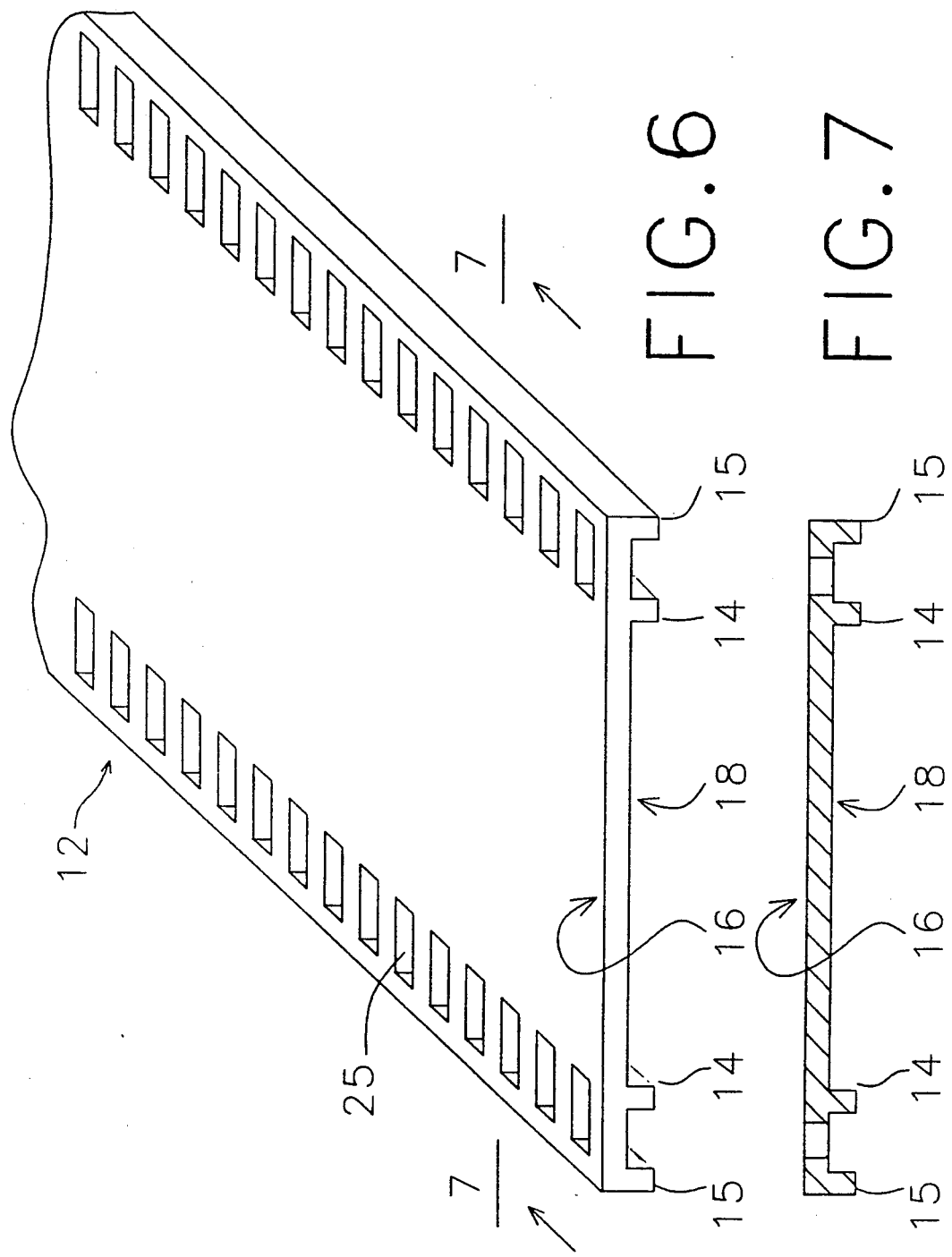

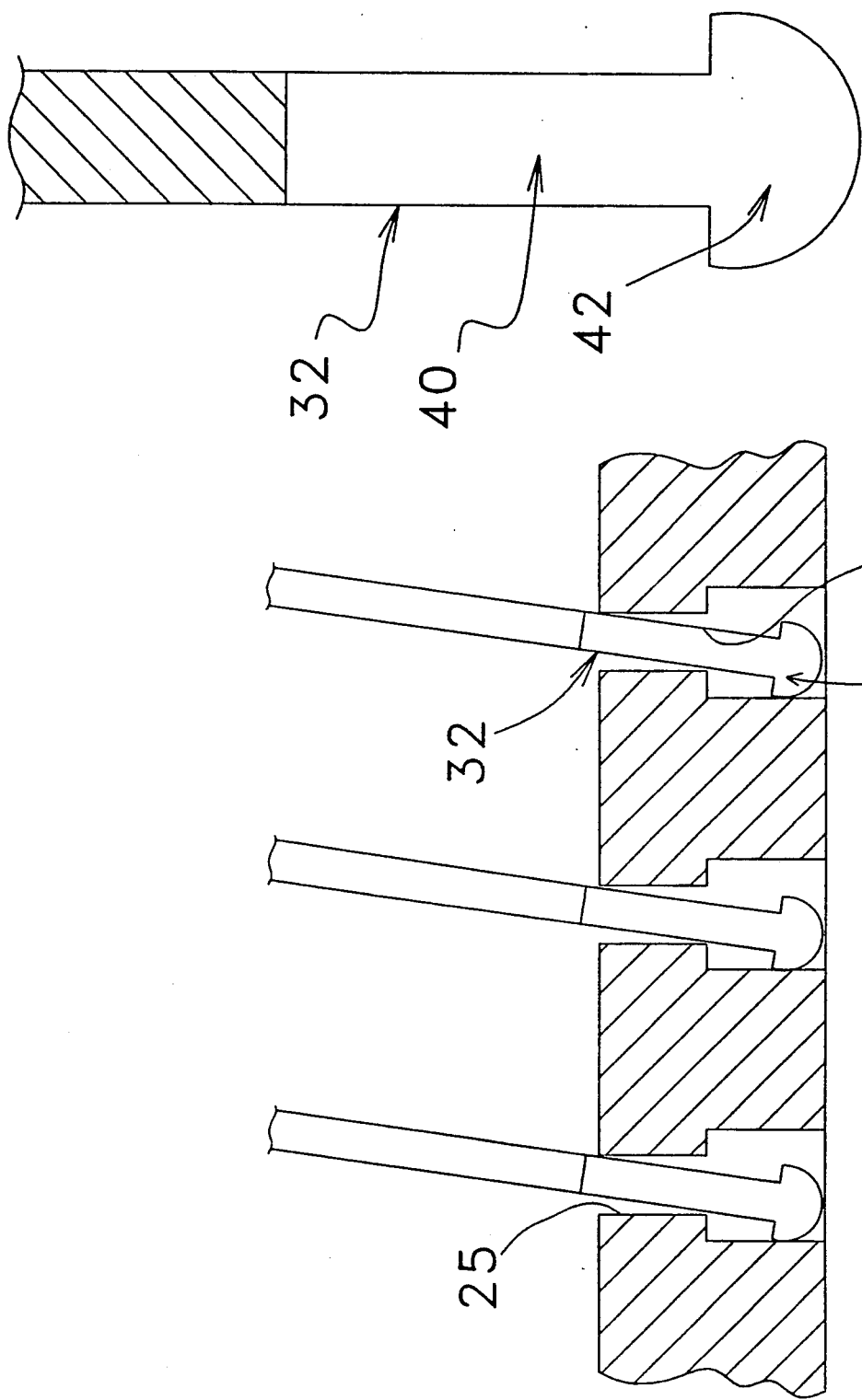

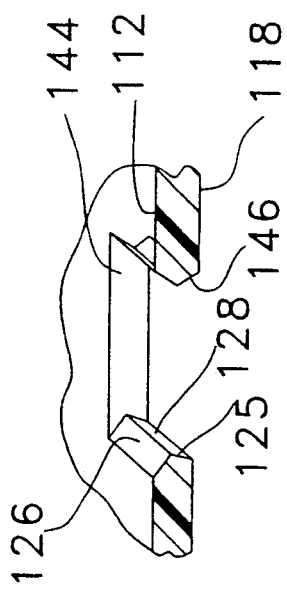
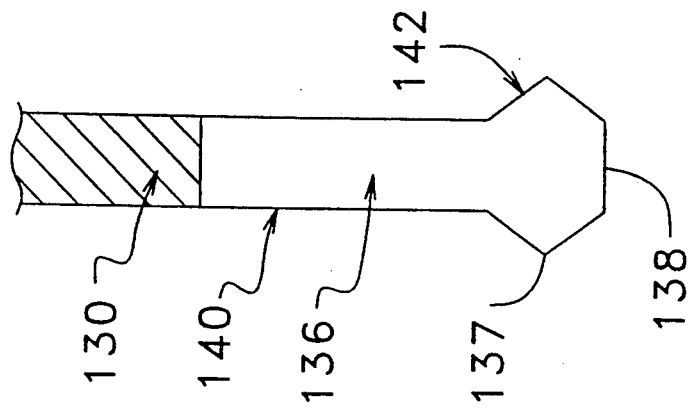
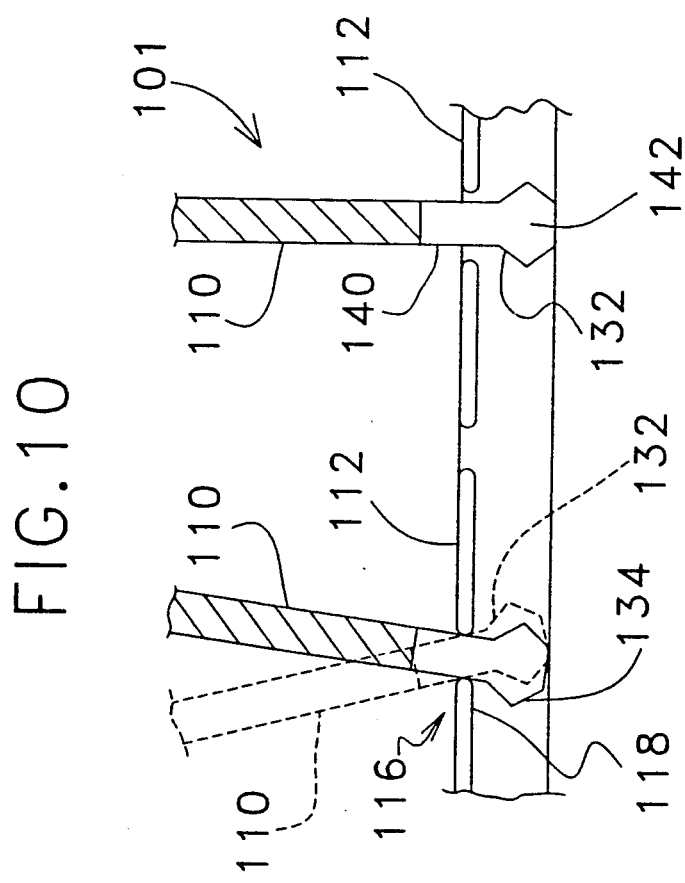

OVERSIZE FILING SYSTEM

TECHNICAL FIELD

The present invention relates to a filing system adapted to be housed in a conventional filing cabinet drawer, utilizing existing hanging folder support rails, to facilitate the filing of large, oversized documents and the like within standard legal and letter size document drawers.

BACKGROUND

Classically, filing cabinet systems comprise a number of manilla or colored cardboard folders which are placed in a drawer and held in an organized vertical position by a backplate which may be adjustably moved in any one of a number of positions along the length of the drawer. However, if this backplate is not constantly adjusted the folders will quickly become disorganized and document damage can occur.

Hanging folder filing systems for file cabinet drawers provide a solution for some of these problems, but suffer from other inadequacies. These systems generally comprise two parallel support rods intended to support a number of cardboard folders in hanging fashion. Products such as these, for example those marketed by the Pendaflex Corporation, provide a means for separating and organizing files into desired groupings, for easy document retrieval. However, such systems, while widely used, suffer various drawbacks. The hanging folders are fixed in size, either legal or letter size, making it difficult or impossible to accommodate oversize documents without damaging them. Even when used with documents of standard 8 ½ inch (22.1 cm) width, as more materials are put into the hanging folder, the folder expands in width and becomes shorter in height, thereby resulting in the materials extending out over the top of the folder. Additionally, the hanging folders have a tendency to move or slide along the support rods, thereby causing files to bunch or the groupings of files to be disrupted, thereby making document retrieval more difficult.

SUMMARY OF THE INVENTION

The inventive system solves the problem of accommodating documents of diverse thickness without sacrificing the organized advantage of conventional hanging folders. In addition, oversize documents can be accommodated without damage. At the same time, the above advantages are achieved in a manner that allows complete retrofitting of the inventive system into existing hanging file systems without sacrifice or modification of existing system hardware. A plurality of rigid, divider members are positioned angularly during storage. The vertical members are supported on the same rails as the hanging file system and lock into the base member.

This filing system comprises a novel slotted base, which is adjustable to adapt to different size filing cabinet drawers, and a plurality of oversized, rigid divider members which divide the storage area. The stationary base contains breakaway grooves to adjust the base plate to fit the particular filing cabinet drawer. The slots within the base plate are spaced so that more divider members may be added to the system as needed, or the divider members may be spaced to accommodate a document of any thickness. The divider members are supported on top by the standard hanging file rails. The tabs rest on the support rails while the divider member is in an out of vertical position preferably at an angle of 60 degrees to help to maintain the material within the file. The divider panels also include tabs at the bottom of each panel to cooperate with slots in the base plate for locking them into place, thereby preventing unwarranted sliding and movement.

One of the principal advantages of the invention resides in the provision of a filing system which allows for the accommodation of both hanging files and oversize document files within the same filing drawer.

Another advantage is the provision of a filing system which incorporates the standard hanging file frame with a novel base, which is adjustable to fit into any conventional filing drawer through the incorporation of breakaway panels in the base.

A further advantage of the invention resides in the base providing a means of locking oversized divider panels securely into place in an angled position to accommodate oversized documents.

BRIEF DESCRIPTION OF THE DRAWINGS

One way of carrying out the invention is described in detail below with reference to drawings which illustrate only one specific embodiment of the invention and in which:

FIG. 1 is a isometric view of the inventive filing system in a conventional filing cabinet drawer;

FIG. 6 is an isometric view of the base plate of the system illustrated in FIGS. 1-5;

FIG. 7 is a cross sectional view along lines 7—7 of FIG. 6;

FIG. 8 is a diagramatic representation of an alternative structure for the present invention;

FIG. 9 is a detail of a divider from the embodiment of FIG. 8;

FIG. 10 illustrates an alternative inventive slot structure;

FIG. 11 is a view similar to FIG. 8 utilizing slot structure illustrated in FIG. 10;

FIG. 12 is a detail showing the divider of the alternative inventive system illustrated in FIG. 10;

BEST MODE FOR CARRYING OUT THE INVENTION

FIG. 1 illustrates the inventive filing system in use in a filing cabinet drawer 3, having a conventional hanging file frame 5. Referring to FIGS. 2-9, the inventive filing system, comprises a plurality of rigid divider panels 10 and an adjustable, removable base plate 12.

As illustrated in

Figure 2:
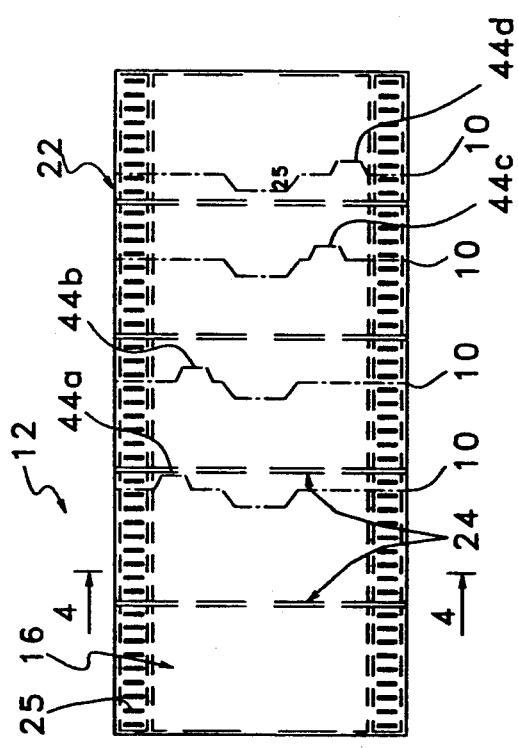
FIG. 2 is a top plan view of the inventive filing system with the filing cabinet structure removed for purposes of clarity of illustration.

FIG. 2, base plate 12 is generally rectangular in shape. Base plate 12 is preferably constructed of substantially rigid plastic having a thickness of about 0.3 cm. As shown in FIG. 6, base plate is formed with inner vertical side faces 14 and outer vertical side faces 15 secured to and integral with a horizontal face 16. Horizontal face 16 defines a bottom face 18 and base slots 25. Side faces 14 and 15 extend lengthwise along the outer portions of base plate 12, and parallel to each other as shown in FIG. 6, providing support to the base plate when the system is under load.

Referring back to FIG. 1, base plate 12 is dimensioned to fit on the bottom of a file cabinet drawer and may be varied in size to fit any conventional size filing cabinet drawer through the utilization of breakaway perforations or grooves 24. In the illustrated embodiment base plate 12 includes four breakaway grooves 24 allowing the user to break apart the base plate at grooves 24 to change the length to fit the dimensions of the file cabinet drawer with which filing system is desired to be used.

Figure 3:
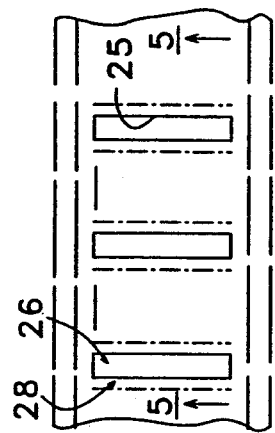
FIG. 3 is a detail of the slots illustrated in FIG. 2.
Figure 4:
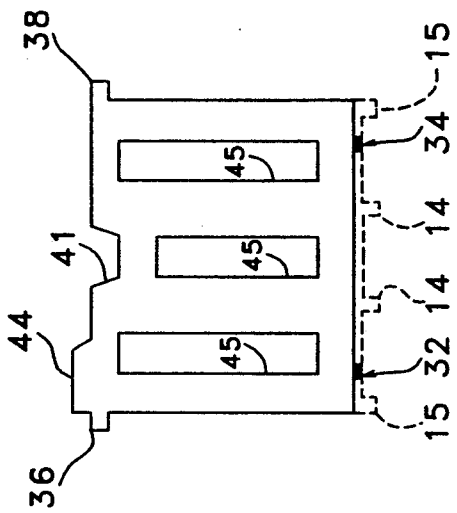
FIG. 4 is a front plan view of the filing system along lines 4—4 of FIG. 2.
Figure 5:
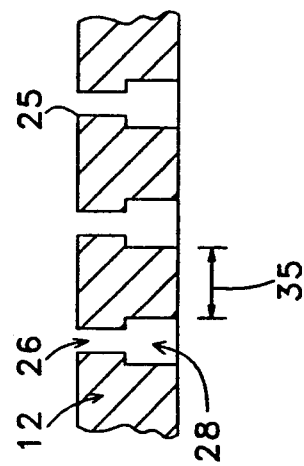
FIG. 5 is a cross sectional view along lines 5—5 of FIG. 3.

A plurality of base slots 25 are disposed transversely in base 12, extending from top face 16 to bottom face 18 in parallel rows, preferably 26 centimeters apart, to mate with a pair of mating depending divider base tabs 32 and 34 on panels 10, as illustrated in FIG. 4. As shown in FIGS. 3, 5, and 7, each base slot 25 has an upper portion 26 and a lower portion 28. Base slot 25 is formed narrower at the upper portion 26 and wider at the lower slot portion 28, as shown in detail in FIGS. 5, 7 and 8, having an upper width of 0.16 cm, a lower width of 0.32 cm and a length of 1.1 cm, forming a locking mechanism for its respective depending divider end tab 32 or 34. The space 35 between each base slot 25 is 0.64 cm. The center to center distance between slots 25 is 1.27 cm.

Referring to FIG. 4 one of the divider panels 10 is illustrated. Each divider panel 10 comprises a relatively flat, rectangular member, preferably composed of substantially rigid plastic material, and preferably having a 0.16 cm. thickness. Divider panel 10 may be die cut, or injection molded, further comprises opposite extending projections 36 and 38, disposed adjacent to the top. Projections 36 and 38 are adapted to rest upon parallel side rails 39 of a conventional hanging file system frame, as illustrated in FIG. 1. Cut away 41 allows the easy grasping of a thick bundle of documents, for example, an oversized computer printout.

In accordance with the preferred embodiment, projections 36 and 38 extend 1.4 cm beyond the vertical sides of divider panel 10 and are 1.27 cm in height. Divider panel 10 is taller than filing cabinet drawer, and is thus in the storage position at an angle to maintain the filing of large documents 35 without extending beyond the top of the drawer. In accordance with the preferred embodiment, each divider panel 10 has a height of 28.6 cm to the top of projections 36 and 38, and a width of 40.4 cm from the outer edge of upper projection 36 to the outer edge of projection 38. At the top edge of the divider panel 10, an index tab 44 is provided. Tab 44 extends 1.27 cm beyond the top edge of divider panel 10 and is typically utilized for efficient file organization and document retrieval. Index tabs 44, 44a, 44b and 44c may be provided, in four different tab locations, as illustrated in phantom lines in FIG. 2.

Referring to FIGS. 4, 8 and 9, at the lower edge of divider panel 10, a pair of end tabs 32 and 34 are disposed at opposite ends of each divider panel 10. End tabs 32 and 34 respectively are adapted to lock in base 12. The top region 40 of end tabs 32 and 34 is slightly thinner than the end tabs' lower region 42 to provide a secure lock when engaged with the mating base slots 25, as illustrated in FIG. 8. Bottom region 42 is carved in configuration. This may be achieved by injection molding or through heat forming of a direct member. Another method of manufacture is through injection molding of the divider panel 10, as well as end tabs 32 and 34. Panels 10 may be provided with cut outs 45 to reduce material cost, by reducing the amount of material needed to form a divider panel 10. The curved bottom region 42 allows the divider panel 10 angular movement to a final position at an angle having a broad range of 55 to 65 degrees and a preferred range of 53 to 63 degrees from the horizontal. This allows movement over a range of about 60 degrees in both a forwards and backwards direction while panels 10 are inserted in base plate 12.

Divider panels 10 are positioned at such an angle to accommodate large documents to be filed in a cabinet drawer meant for legal or letter size documents.

Divider panels 10 may be repositioned by insertion of end tabs 32 and 34 into pair of mating base slots 25 disposed along the length of the base plate 12. Furthermore, additional divider panels 10 may be added to the inventive filing system as needed, in the same manner as the panels illustrated in the figures.

An alternative embodiment of the inventive system is illustrated in FIGS. 10 through 13. Generally, similar parts or parts performing analogous, corresponding or identical functions to those of the embodiment of FIGS. 1 through 9, are numbered herein with numbers which differ from those of the earlier embodiments by multiples of one hundred.

In an alternative embodiment, shown in FIGS. 10-13, end tabs 132 (hidden) and 134 of panels 110 are formed with a 0.16 cm width at the top region 136, angling outward to a widest dimension of 0.32 cm at point 137 and angling inward to a flat bottom 138 with a width of 0.16 cm. The shape of end tabs 132 and 134 is adapted for insertion into base slots 125 of the base plate 112. This results in securing divider panel 110 in base 112, while providing for angular movement of the divider panel 110 in both forward and backward directions to a final position in the range of 52 to 62 degrees with respect to the horizontal plane, preferably about 57 degrees. This angled position enables large document storage as well as easy document retrieval without accidental displacement or disengagement of divider panel 110 from base plate 112.

Base slots 125 are cut angularly along their length, as shown in FIGS. 10 through 11, to accommodate end tabs 132 and 134. Each base slot 125 has two upper faces 126 and 144 disposed facing to each other. Two lower faces 128 and 146 are disposed to each other. As illustrated in FIG. 10, upper portions 126 and 144 are cut inward toward the center of the base slot 125. Lower portions 128 and 146 are also cut inward so upper portion 126 and its respective lower portion 128 form an edge. Base slot 125 is formed to allow for an angled stable rest position for its respective divider panels 110, as well as for securing said divider panels into the desired base slot as illustrated in FIG. 11.

Figure 13:
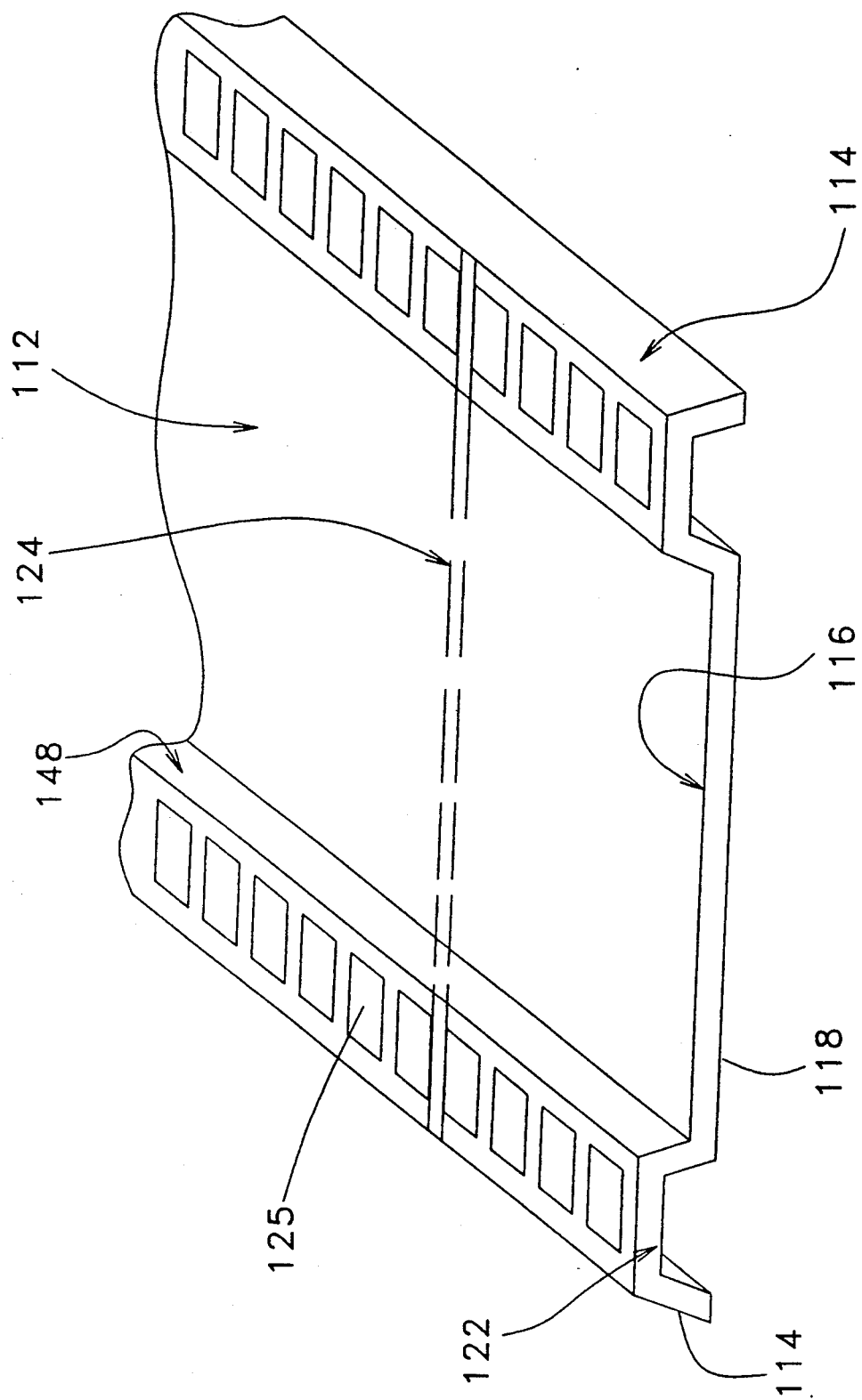
FIG. 13 is an isometric view of another alternative base structure.

FIG. 13 illustrates the configuration of base plate 112, which is also generally rectangular. Base plate 112 is preferably constructed of 0.32 cm thick plastic, which like base plate 12, may be more resilient and bendable than the dividers and thus more durable. This is valuable. Base plate 112 has vertical side faces, 114, a horizontal top face 116, a bottom face 118, and two ridges 122, integrally formed as part of the top face 116. Ridges 122, extend lengthwise and parallel along the outer portions of base plate 112, and are raised above the height of base plate 112. As shown in FIG. 13, ridges 122 incorporate the outer sidefaces 114 of base plate 112 and inner sidefaces 148 to provide support to the base plate 112 when the system 101 is under load.

Generally, base plate 112 includes four breakaway perforations or grooves 124, preferably 0.16 cm wide by 0.16 cm long. The user cuts along the perforated line(s) to the achieve desired length of base plate 112.

Base plate 112 further comprises base slots 125 which are disposed transversely along said ridges in base 112, extending through the top wall 116, in parallel rows, preferably 10 inches apart, and aligned in relation to the depending divider end tabs 132 and 134.

Base slots 125 are die cut, or injection molded as illustrated in FIG. 10. The bottom face 118 provides additional support to base plate 112 when the system 101 is under load.

Figure 14:
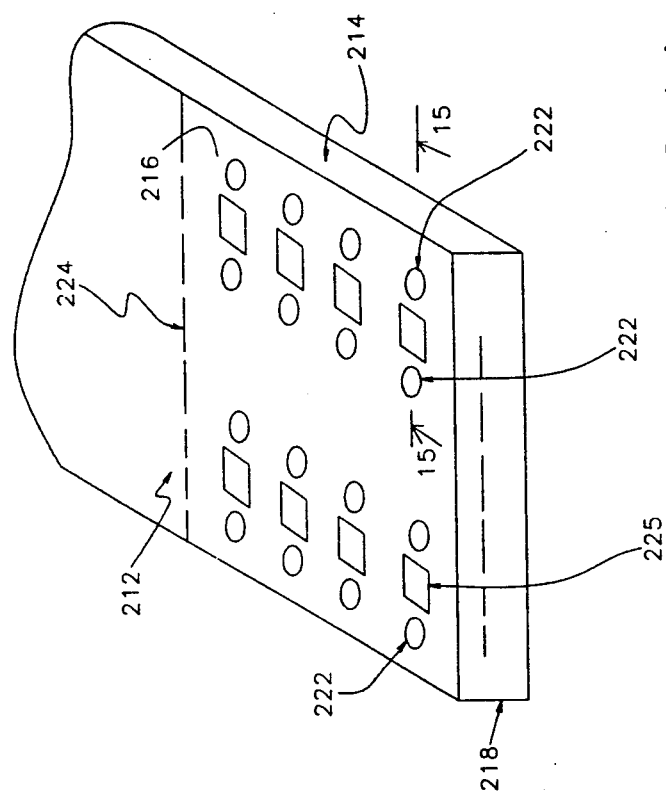
FIG. 14 is an isometric view of still yet another alternative base structure.
Figure 15:
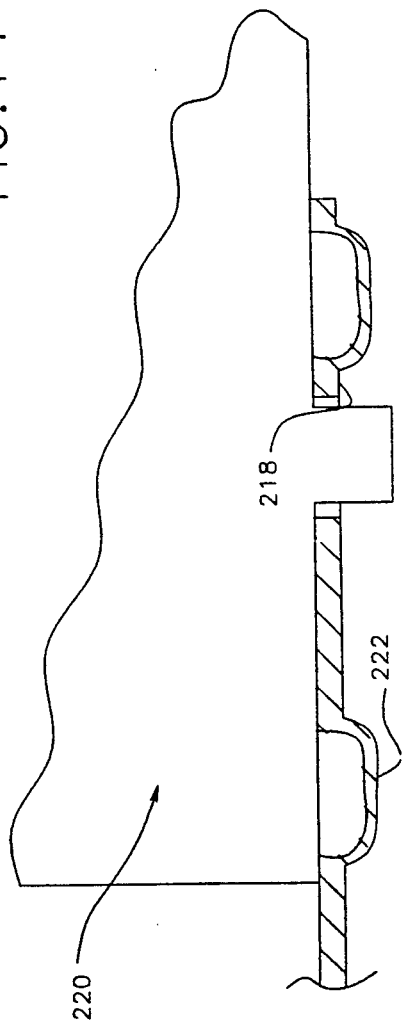
FIG. 15 is a cross sectional view along lines 15—15 of a portion of the structure illustrated in FIG. 14.

In a further embodiment of the inventive base plate illustrated in FIGS. 14 and 15, a base plate 212 is rectangular in shape, comprising a top face 216, and a bottom face, 218. Base plate 212 is preferably constructed of 0.32 cm durable plastic, having base support indents 222. Indents 222 may be integrally formed through injection molding of base plate 212. Alternatively, base plate 212 may be made by die cutting flat material and heat forming indents 222. The base support indents are disposed lengthwise and parallel, along the outer and inner portions of base plate 212 providing support when under the system is under load.

Base plate 212 also includes breakaway perforations or grooves 224, preferably 0.16 cm wide by 2.92 cm long. Base plate 212 also has base slots 225 which are disposed transversely along the length of base plate 212, extending through the top face 216 to the bottom face 218, in parallel rows, preferably 2.6 cm apart, and aligned in relation to the depending divider end tabs of a divider panel 220.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A removable filing system adaptor for accommodating oversized documents, and adapted to be inserted into a filing cabinet drawer within a filing cabinet, said drawer having a given overall drawer height and said filing cabinet defining a clearance orifice for receiving said drawer, said clearance orifice having a clearance height greater than said drawer height, said filing cabinet drawer having a pair of parallel hanging file side rails for supporting hanging files and having a generally horizontally oriented drawer bottom, said filing system adaptor, comprising:

(a) a base member configured and dimensioned to lie on said drawer bottom and a plurality of slots disposed in a row, said slots being defined by said base member and disposed in alignment with each other said slots being configured, dimensioned and positioned to engage a respective slot-engageable locating means; and (b) a plurality of generally oversized divider members, dimensioned to be greater in height than said drawer height to support in a non-vertical position documents substantially taller than a standard sized document in a conventional, standard letter size or legal size filing cabinet drawer when said divider members are oriented at a non-vertical position, said divider members each having a top edge and a bottom edge, a pair of tabs extending laterally from each of said divider members to rest on said parallel side rails, and each of said divider members having said slot-engageable locating means depending from said bottom edge to engage its respective divider member on said base member while each of said divider members rest in an upright position or in an inclined position, each said slot-engageable locating means being adapted to engage its respective one of said slots.

2. A filing system adaptor according to claim 1 wherein said tabs project in opposite outward directions and are disposed adjacent to opposite ends of said top edge of its respective divider member, said tabs being configured and dimensioned to support said divider, members at an inclined position ranging between 53 and 63 degrees from the horizontal, in both a backward and forward orientation from a perpendicular relationship to said base member, said tabs resting upon said parallel side rails.

3. A filing system adaptor according to claim 2 wherein said slots comprise a top portion and a bottom portion, with each of said slots having a greater width dimension at said bottom portion of said slot than at said top portion of said slot, providing a means to secure each of said divider members into said base member, and adapted to permit pivotal movement of each of said divider members between said perpendicular relationship and said inclined position.

4. A filing system adaptor according to claim 1 wherein said slot-engageable locating means comprises a pair of locating extensions on each of said divider members and each of said locating extensions has an enlarged bottom portion, with a greater width dimension than a smaller upper portion of each of said locating extensions, being adapted to be inserted into said slots in said base member, allowing for the plane of each of said divider members to be positioned angularly, at an angle ranging from 53 to 63 degrees from the horizontal, in both a backward and forward orientation from a perpendicular relationship to said base member, while securing each of said divider members in said base member.

5. A filing system adaptor as in claim 1, wherein said base member is made of flexible plastic.

6. A filing system adaptor as in claim 1, wherein each said slot-engageable locating means comprising a pair of die cut lower tabs which matingly lock into said slots.

7. A filing system adaptor according to claim 1 further comprising a second row of slots, said slots in said second row being aligned with the slots in the other row, and wherein said slots are positioned an a raised portion of said base member.

8. A filing system adaptor according to claim 7 wherein pairs of slot-engageable locating means have a bottom portion with dimensions mating to the dimensions of said slots, adapted to be inserted into said slots in said base member, and allowing the planes of said divider members to be positioned angularly forward and backward from the perpendicular plane of said base member, while securing said divider members in said base member.

9. A filing system adaptor according to claim 1, wherein said base member has a plurality of breakaway perforations extending through and across said base member, said perforations being positioned at various selected distances lengthwise along said base member, wherein said perforations are adapted to allow a portion or portions of said base member to be separated and removed from the remaining portion of said base member to adjust the size of the base member to fit a particular filing cabinet drawer.

10. A filing system comprising a conventional standard letter size or legal size filing cabinet drawer having a pair of hanging filing frame support rails configured and dimensioned to support a plurality of conventional, standard size hanging files depending therefrom, in combination with an adaptor to accommodate oversized documents according to claim 1.

11. A removable, adjustable filing system adaptor dimensioned for accommodation of oversized documents, said oversized documents being larger than standard sized documents, said filing system adaptor adapted to be inserted into a standard size filing cabinet drawer within a filing cabinet, said filing cabinet drawer comprising a pair of parallel side rails for supporting hanging files and having a generally horizontally oriented drawer bottom, said filing system adaptor comprising:
(a) a base member configured and dimensioned to lie on said drawer bottom, said base member having a top face at least a portion of which is raised above said drawer bottom;
(b) a pair of substantially parallel rows of slots formed in said portion of said base member, disposed in alignment with each other and spaced laterally within said filing cabinet drawer in relation to each other; and
(c) a plurality of generally oversized divider members each having a top edge and a bottom edge, a pair of tabs extending laterally from each of said divider members to rest on said parallel side rails at a position where said divider members are oriented at a non-vertical angle with respect to said base member, and said divider members each having a pair of slot-engageable locating means depending from said bottom edge to support said divider members on said base member, each said pair of slot-engageable locating means being adapted to engage in said slots and to cooperate therewith to permit pivotal movement of said divider members between an upright position and an inclined position in which said tabs engage said side rails to provide support; and wherein said divider member and said oversized documents each have a vertical height that is greater than the total vertical height of said filing cabinet drawer, requiring said divider members to lie in an inclined position to receive and support said oversized documents within said filing cabinet drawer when said drawer is closed, and said oversized documents having, in an upright position, a height greater than the clearance for said filing cabinet drawer defined by said filing cabinet.

12. A filing system adaptor as in claim 11, wherein each of said oversized divider members have a deep cutout opening to permit a user to identify said oversized documents inserted into said filing system adaptor and to grip said oversized documents inserted into said filing system adaptor.

13. A removable, adjustable filing system adaptor to accommodate oversized documents, in combination with a filing cabinet drawer within a filing cabinet, said filing cabinet drawer having a generally horizontally oriented drawer bottom, said filing system adaptor comprising:
(a) a removable base member configured and dimensioned to lie on said drawer bottom, said base member having a top face raised above said drawer bottom;
(b) a pair of substantially parallel rows of slots, formed in said base member, disposed in alignment with each other and spaced laterally within said filing cabinet drawer in relation to each other; and
(c) a plurality of generally oversized divider members and a plurality of oversized documents, each of said oversized divider members having a top edge and a bottom edge and having a pair of slot-engageable locating means depending from said bottom edge to support each of said divider members on said base member, each said pair of slot-engageable locating means being adapted to engage in said slots and to cooperate therewith to permit pivotal movement of each of said divider members between an upright position and an inclined position, said inclined position ranging between 53 and 63 degrees from the horizontal, in either a backward or forward orientation from a perpendicular relationship to said base member, while securing each of said divider members in said base member, and each of said divider members having a deep cutout opening into said top edge to permit identification of said oversized documents and gripping of said oversized documents filed between said divider members; and
wherein said divider members each have a vertical height that is greater than the total vertical height of said filing cabinet drawer, requiring said divider members to lie in an inclined position to receive and support said oversized documents within said filing cabinet drawer when said drawer is closed, and said oversized documents having, in an upright position, a height greater than the clearance for said filing cabinet drawer defined by said filing cabinet.

* * * * *